(12) United States Patent
Harkness et al.

(10) Patent No.: US 9,373,850 B2
(45) Date of Patent: Jun. 21, 2016

(54) PROCESS FOR PREPARING A CATALYTIC MATERIAL

(71) Applicant: JOHNSON MATTHEY FUEL CELLS LIMITED, London (GB)

(72) Inventors: Ian Roy Harkness, Oxford (GB); Alexander Martin Willcocks, London (GB); Edward Anthony Wright, Oxfordshire (GB)

(73) Assignee: JOHNSON MATTHEY FUEL CELLS LIMITED, London (GB)

( * ) Notice: Subject to any disclaimer, the term of this patent is extended or adjusted under 35 U.S.C. 154(b) by 0 days.

(21) Appl. No.: 14/419,374

(22) PCT Filed: Aug. 5, 2013

(86) PCT No.: PCT/GB2013/052085
§ 371 (c)(1),
(2) Date: Feb. 3, 2015

(87) PCT Pub. No.: WO2014/023944
PCT Pub. Date: Feb. 13, 2014

(65) Prior Publication Data
US 2015/0207153 A1 Jul. 23, 2015

(30) Foreign Application Priority Data

Aug. 10, 2012 (GB) .................................. 1214326.9

(51) Int. Cl.
*B01J 23/00* (2006.01)
*H01M 4/88* (2006.01)
(Continued)

(52) U.S. Cl.
CPC .......... *H01M 4/8842* (2013.01); *H01M 4/8657* (2013.01); *H01M 4/8825* (2013.01);*H01M4/8878* (2013.01); *H01M 4/9041* (2013.01); *H01M 4/9075* (2013.01); *H01M 4/92* (2013.01); *H01M 4/921* (2013.01); *H01M 4/925* (2013.01); *H01M 2008/1095* (2013.01); *Y02E 60/50* (2013.01)

(58) Field of Classification Search
CPC .................................................... H01M 4/8842
USPC ......................................................... 502/325
See application file for complete search history.

(56) References Cited

U.S. PATENT DOCUMENTS

| | | | |
|---|---|---|---|
| 2010/0099012 | A1 | 4/2010 | Adzic |
| 2010/0177462 | A1 | 7/2010 | Adzic et al. |
| 2010/0199488 | A1 | 8/2010 | Bray et al. |

FOREIGN PATENT DOCUMENTS

| | | |
|---|---|---|
| EP | 1 021 246 B1 | 7/2000 |
| WO | 2005/020356 A1 | 3/2005 |

(Continued)

OTHER PUBLICATIONS

Minhua Shao et al.: "Electrocatalysis on Platinum Nanoparticles: Particle Size Effect on Oxygen Reduction Reaction Activity", UTC Power, South Windsor, Connecticut 06074, United States, United Technologies Research Center, East Hartford, Connecticut 06118, United States, 2011 American Chemical Society, Nano Lett. 2011, 11, 3714-3719.

(Continued)

*Primary Examiner* — Colleen Dunn
*Assistant Examiner* — Haytham Soliman
(74) *Attorney, Agent, or Firm* — Young & Thompson

(57) ABSTRACT

A process for preparing a catalytic material including (i) a support material and (ii) a thin film catalyst coating, the coating including one or more first metals, wherein the process includes the steps of: providing a multilayer thin film coating of a second metal on the support material; and spontaneous galvanic displacement of at least some of the second metal with the one or more first metals; wherein the second metal is less noble than the one or more first metals.

13 Claims, 1 Drawing Sheet

(51) Int. Cl.
*H01M 4/86* (2006.01)
*H01M 4/92* (2006.01)
*H01M 4/90* (2006.01)
*H01M 8/10* (2016.01)

(56) References Cited

FOREIGN PATENT DOCUMENTS

| WO | 2009/135189 | A1 | 11/2009 |
| WO | 2010/107822 | A2 | 3/2010 |
| WO | 2012/080726 | A1 | 6/2012 |
| WO | 2013/045894 | A1 | 4/2013 |
| WO | 2013/144631 | A1 | 10/2013 |

OTHER PUBLICATIONS

M.K. Debe, Chapter 45 "Novel catalysts, catalysts support and catalysts coated membrane mehtods", 3M Company, St. Paul, MN, USA, Handbook of Fuel Cells—Fundamentals, Technology and Applications, vol. 3, Fuel Cell technology and Applications, 2003 John Wiley & Sons, Ltd. ISBN: 0-471-49926-9, pp. 576-589.

International Search Report, dated Nov. 6, 2013, from corresponding PCT application.

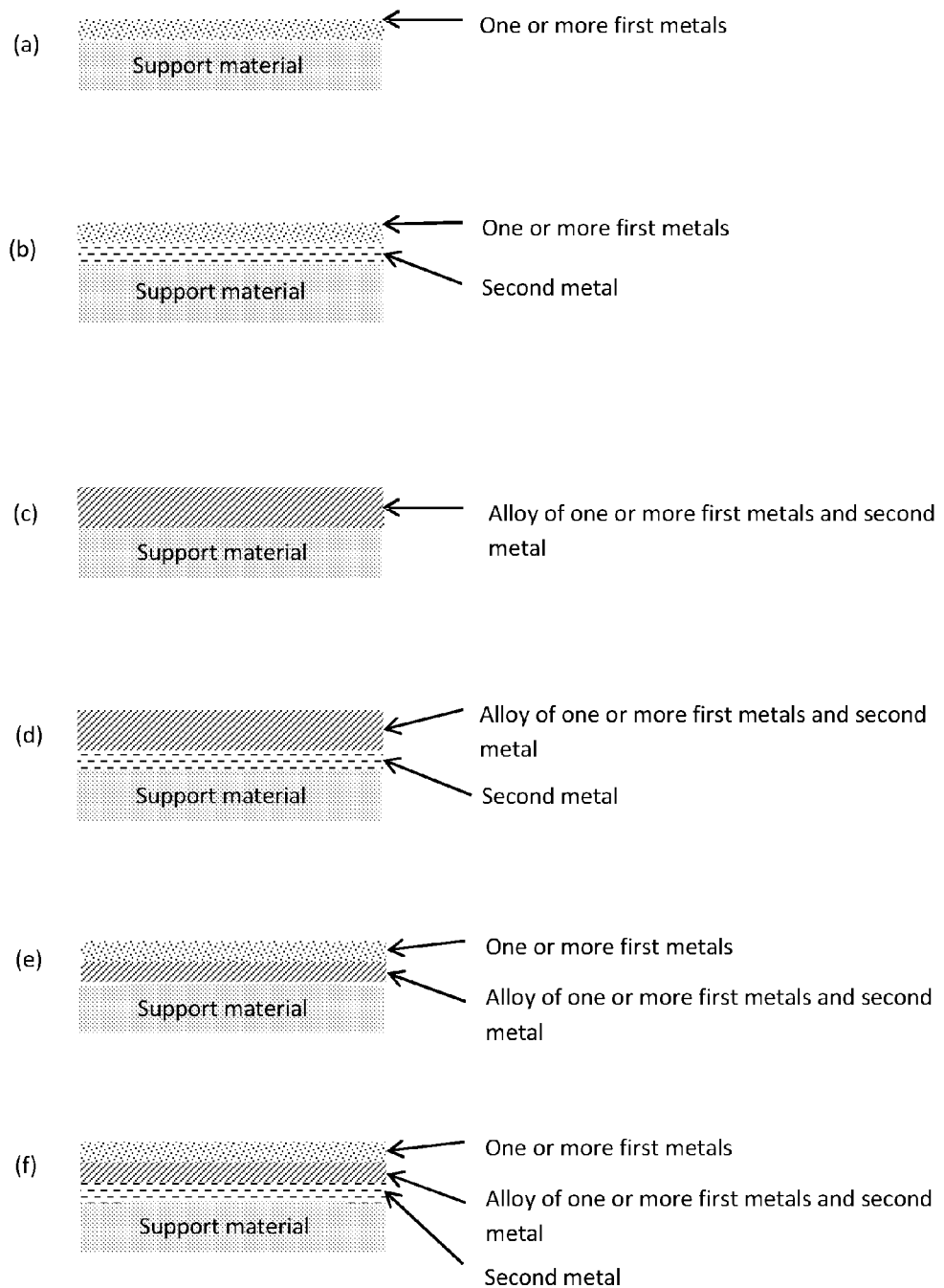

PROCESS FOR PREPARING A CATALYTIC MATERIAL

The present invention relates to a novel process for preparing a catalytic material, and in particular for preparing a catalytic material for use in an electrode in an electrochemical device, in particular a fuel cell, such as a proton exchange membrane fuel cell.

A fuel cell is an electrochemical cell comprising two electrodes separated by an electrolyte. A fuel, such as hydrogen or an alcohol such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In proton exchange membrane (PEM) fuel cells, the electrolyte is a solid polymeric membrane. The membrane is electronically insulating but proton conducting, and protons, produced at the anode, are transported across the membrane to the cathode, where they combine with oxygen to form water.

The principal component of a PEM fuel cell is known as a membrane electrode assembly (MEA) and is essentially composed of five layers. The central layer is the ion-conducting polymer membrane. On either side of the ion-conducting membrane there is an electrocatalyst layer, containing an electrocatalyst designed for the specific electrochemical reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanometer sized particles (such as metal blacks or other unsupported particulate metal powders) or can be deposited as even higher surface area particles onto a conductive carbon substrate, or other conductive material (a supported catalyst).

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

Existing state of the art electrocatalyts used in fuel cells are typically made from platinum or platinum alloys supported on conducting high surface area carbon supports. The carbon allows a high surface area of platinum to be created typically in the form of discrete nano-particles of approximately spherical geometry. The carbon support also forms a porous layer such that gaseous reactants and liquid products, or liquid reactants and gaseous products, can move to and from the electrocatalytic nano-particles. In real operational conditions, particularly at the cathode of a fuel cell where the oxygen reduction reaction occurs, a number of problems arise with carbon supported catalysts including corrosion of the carbon support and dissolution and sintering of the platinum or platinum alloy catalyst particles leading to loss of performance. A further, and more important, problem with such catalysts is that the amount of platinum needed for sufficient power output from a stack is considered too high for economic application in cost critical applications such as in automotive drive trains. Therefore, of particular need, are improved catalysts for the oxygen reduction reaction. Although the existing nano-particulate platinum particles supported on carbon have high platinum surface area (surface area per unit mass of Pt—$m^2/g_{Pt}$) typically greater than 50 $m^2/g_{Pt}$, the surface has a low intrinsic surface specific activity (activity in terms of current generated per unit area of catalyst surface—$\mu Acm^2_{Pt}$) when they are equal to or less than about 3 nm in diameter (M. Shao, A. Peles, K. Shoemaker, Nano Letters, 11, 3714-3719 (2011)). This results in the overall mass activity in terms of current generated per unit mass of platinum ($A/mg_{Pt}$) being lower than required. In addition, particles of this size have poor resistance to potential cycling and can both dissolve and sinter rapidly. It is also typical with the state-of-the-art catalysts that a high proportion of the carbon support surface area remains uncovered, which can be oxidised at the high potentials that occur on the cathode during routine operation and at the even higher potentials that can occur during start up and shut down periods.

One of the contributions to the low surface specific activity and to the poor stability of small platinum particles is the high number of atoms in low co-ordination sites. An atom at a low co-ordination site has fewer bonds to other platinum (metal) atoms. For example, for an octahedron, the atoms at the corners have only four near neighbours (co-ordination number=4), atoms at an edge have seven and atoms within the (111) plane have nine near neighbours. For a small octahedron, there is a higher proportion of corner and edge sites compared to a large octahedron. Atoms at low co-ordination sites are more vulnerable to dissolution because they are not as strongly bound to the solid particle and they are also able to bond more strongly to oxygen, which means it is harder to carry out the oxygen reduction reaction; the metal tends to form an oxide rather than water.

When the particles are larger than 3 nm in diameter they have a lower proportion of low co-ordination atoms and are thus more stable and also have a higher specific surface activity. However, since the overall catalyst surface area is lower, they typically have a lower platinum mass activity. Since only the surface of the particle can act electrocatalytically the majority of the valuable platinum metal within the larger particle is not used.

Alternative structures, such as the acicular structures of platinum supported on polymer fibrils as disclosed in EP 1 021 246 B1 have been proposed as suitable alternative catalysts for the oxygen reduction reaction. These catalysts can have higher specific activities than state-of-the-art nano-particulate catalysts, but because the surface area to volume ratio of the platinum structures is still low and the platinum surface areas are therefore also low (typically around 10 $m^2/g_{Pt}$) (Handbook of Fuel Cells—Fundamentals, Technology and Applications, Volume 3: Fuel Cell Technology and Applications, pages 576-589), the mass activity is not sufficiently improved.

Therefore, there remains the need for improved catalysts which demonstrate higher mass activity than the current designs and which are also stable to dissolution and sintering of the platinum and to support corrosion. International patent application PCT/GB2013/050815, the contents of which are incorporated herein by reference, discloses a novel catalytic material comprising (i) a support material and (ii) a thin film catalyst coating, the thin film catalyst coating having a mean thickness of ≤8 nm, wherein at least 40% of the surface area of the support material is covered by the thin film catalyst coating. Also disclosed is a catalytic material comprising (i) a support material and (ii) a thin film catalyst coating, the thin film catalyst coating having a surface area of at least 25 m$^2$/g, suitably at least 40 m$^2$/g, preferably at least 50 m$^2$/g, wherein at least 40% of the surface area of the support material is covered by the thin film catalyst coating. The improved catalytic material disclosed in this application demonstrates improved mass activity over state-of-the-art catalysts. In addition, the catalytic material demonstrates improved stability to dissolution and sintering and support corrosion. The thin film catalyst coating can be applied to the support material by a number of methods including, but not limited to, vacuum techniques including plasma assisted, gas phase techniques including plasma assisted, electrochemical techniques or chemical deposition. In particular, the following techniques may be used: atomic layer deposition, electrodeposition, electrophoresis, chemical vapour deposition, physical vapour deposition, plasma assisted deposition techniques, sputtering and evaporation. A particularly preferred technique is atomic layer deposition.

Atomic layer deposition is a technique particularly suited to the formation of continuous thin film layers, as present in the catalytic material described above. However, the thickness at which layer continuity occurs is highly dependent on a number of factors including, but not limited to, the surface energies of both the catalyst material being deposited and the substrate onto which the catalyst material is deposited, the surface chemistry of the substrate, the thermal stability of the precursor and the reactivity of the precursor ligands. As a result, it is often difficult to produce continuous thin film layers at very low thicknesses.

A continuous thin film layer of platinum is an attractive structure for oxygen reduction electrocatalysis as it would be expected to exhibit a greater reactivity per unit area than platinum nanoparticles and to exhibit better stability to dissolution and loss of active area as a result of sintering. Due to the cost of platinum, in order for these advantages to be realised at an economic cost, the layer of platinum must be very thin, thinner than is generally obtainable by platinum atomic layer deposition. Furthermore, adhesion of the platinum to the substrate when the platinum has been applied by atomic layer deposition may not be sufficient.

The present inventors have provided an improved method for preparing a catalytic material, such as that described in the above-mentioned patent application. Accordingly, the present invention provides a process for preparing a catalytic material comprising (i) a support material and (ii) a thin film catalyst coating, said coating comprising one or more first metals and optionally a second metal, wherein said process comprises the steps of:
(i) providing a multilayer thin film coating of the second metal on the support material; and
(ii) spontaneous galvanic displacement of at least some of the second metal with the one or more first metals;

wherein the second metal is less noble than the one or more first metals.

The phrase 'less noble' refers to the position of the second metal in the electrochemical series relative to the first metal, and the second metal will have a more negative standard electrode potential)(E$^0$) than that of the first metal.

The one or more first metals are suitably selected from the group consisting of the platinum group metals (platinum, palladium, rhodium, ruthenium, iridium and osmium), gold or silver, or a base metal. More suitably, the one or more first metals are selected from the group consisting of the platinum group metals, gold and silver and in particular platinum. Suitably, there are one, two or three first metals, more suitably either one first metal or two first metals.

The second metal is suitably a base metal, for example a transition metal, for example a first row transition metal, and in particular iron, cobalt, nickel and copper.

Step (i) may be carried out by any process which provides a multilayer thin film coating of the second metal onto the support material, for example by atomic layer deposition, chemical vapour deposition, or by a plating technique. A multilayer coating is a coating that is at least two atoms in thickness, such as 2 to 100 atoms in thickness, for example 2 to 50 atoms thickness. Preferably, the second metal is deposited on the support material using atomic layer deposition. Alternatively, a two-step process may be used, wherein a compound of the second metal, for example the nitride, is applied to the support material, suitably by one of the techniques described above and preferably by atomic layer deposition, followed by a reduction process to reduce the second metal compound to the second metal. The reduction process may be carried out using any suitable reducing agent, for example hydrogen. The multilayer thin film coating of the second metal covers at least 40% of the surface area of the support material, suitably at least 50%, more suitably at least 60%, even more suitably at least 75%, preferably at least 90% and most preferably at least 95% of the surface area of the support material. In one embodiment, the multilayer thin film coating of the second metal covers 100% of the surface area of the support material. Optionally the surface of the multilayer thin film coating of the second metal may be roughened or structured by a chemical or electrochemical treatment process to increase its surface area.

Step (ii) is carried out by spontaneous galvanic displacement. The support material with the multilayer thin film coating of the second metal is exposed to a solution containing cations of the one or more first metals. The second metal is oxidised and the cations formed enter into the solution, while simultaneously the cations of the one or more first metals are reduced, such that the one or more first metals is deposited on the surface of the second metal or onto the support material. Thus, the second metal coating is progressively dissolved and a thin film catalyst coating comprising the one or more first metals, and optionally any remaining second metal, is formed in its place. Typically, the spontaneous galvanic displacement will be carried out at open circuit conditions; however, the use of potential control by connecting a potentiostat to both the coated substrate, a suitable counter electrode and to a reference electrode immersed in the solution of the one or more first metals could be used. Suitable control of the potential during the galvanic displacement is used to control the morphology of the thin film catalyst coating. The thin film catalyst coating covers at least 40% of the surface area of the support material, suitably at least 50%, more suitably at least 60%, even more suitably at least 75%, preferably at least 90% and most preferably at least 95% of the surface area of the support material. In one embodiment, the thin film catalyst coating covers 100% of the surface area of the support material.

In one aspect of the invention, the entire multilayer thin film coating of second metal is replaced with the one or first metals, resulting in a support material having a thin film catalyst coating consisting of the one or more first metals (see FIG. 1a).

In a second aspect of the invention, the multilayer thin film coating of second metal is not completely replaced with the one or more first metals resulting in a support material having a thin film catalyst coating comprising the one or more first metals and some second metal. Such a partial replacement can be effected by controlling the conditions, such as time of exposure to the solution containing cations of the first metal, concentration of the solution, temperature etc. Suitably, 10 to 99.5 atomic % of the second metal is replaced by the one or more first metals.

In a first embodiment of the second aspect of the invention, the one or more first metals and the remaining second metal are in separate layers in the thin film catalyst coating, such that there is little or no mixing of the one or more first and second metals (see FIG. 1b). Suitably from 80 to 99.5 atomic % of the second metal is displaced by the one or more first metals.

In a second embodiment, at least some of the one or more first metals and at least some of the remaining second metal form an alloy. Suitably, from 10 to 80 atomic % of the second metal is displaced by the one of more first metals. Formation of such an alloy may require a further processing step, for example heat treatment at a temperature of from 150° C. to 1500° C., suitably 300° C. to 1000° C. The extent of the alloying can be controlled by the ratio of the one or more first metals: second metal, the temperature of the heat treatment, the time of the heat treatment and the atmosphere of the heat treatment process. Depending on the conditions, the thin film catalyst coating may comprise a single layer comprising an alloy of the one or more first metals and the remaining second metal (i.e. the second metal left after the spontaneous galvanic displacement reaction) (see FIG. 1c). Alternatively, the thin film catalyst coating may comprise: (i) an outer layer comprising an alloy of the one or more first metals and part of the remaining second metal and a separate layer of the other part of the remaining second metal between the alloyed layer and the substrate (see FIG. 1d); or (ii) an outer layer of the one or more first metals and a separate layer comprising an alloy of the one or more first metals and the remaining second metal between the outer layer of the one or more first metals and the substrate (see FIG. 1e); or (iii) an outer layer of the one or more first metals, a layer of part of the remaining second metal adjacent to the substrate, and sandwiched between the outer first metal layer and the second metal layer, a layer comprising an alloy of the one or more first metals and the other part of the remaining second metal (see FIG. 1f).

Formation of such an alloy of the one or more first metals and the remaining second metal may result in increased activity depending on the choice of second metal. In a further embodiment, a subsequent process step is carried out in which one or more of the first and/or second metals is removed, or partially removed from the alloy, for example by a selective leaching process providing a thin film catalyst coating having been depleted in one or more of the first and/or second metals compared to the thin film catalyst coating before the subsequent process step; i.e. forming a 'de-alloyed' thin film catalyst coating.

The thickness of the multilayer coating formed in step (i) of the process will be dependent on the final structure of the thin film catalyst coating. For example, the thickness of the multilayer coating formed in step (i) to give a thin film catalyst coating according to FIG. 1a would require fewer multilayers of atoms than the thickness of the multilayer coating formed in step (i) to give a thin film catalyst coating according to FIGS. 1b to 1f.

Steps (i) and/or (ii) can be repeated as required to provide further layers within the thin film catalyst coating. For example, in one embodiment a process comprising step (i) followed by a first and second step (ii) may be carried; alternatively a process comprising step (i), step (ii), followed by a second step (i), followed by a second step (ii) may be carried out. The skilled person will appreciate there are a number of variations comprising steps (i) and (ii) that could be used and all such variations are within the scope of the present invention.

In a further aspect of the present invention, an adhesion layer is applied to the support material prior to providing the multilayer thin film coating of the second metal. Such an adhesion layer will facilitate nucleation of the second metal on the support material. The adhesion layer will suitably be electrically conductive and may be an oxide, nitride or carbide, for example a metal nitride or mixed metal nitride (e.g. titanium nitride or titanium aluminium nitride); a metal oxide, including doped and mixed oxides (e.g. niobium-doped titania and mixed platinum group metal oxides (e.g. $IrRuO_x$ or those disclosed in PCT/GB2011/052472 hereinbefore described); carbon- or boron-doped diamond. Suitably, the adhesion layer is deposited by atomic layer deposition, electrodeposition, electrophoresis, chemical vapour deposition, physical vapour deposition, plasma assisted deposition techniques, sputtering and evaporation.

The form of the thin film catalyst coating exists as elements that may be of various different geometries, but all characterised by the elements of the thin film having a lateral dimension that is greater than the thickness direction. The perimeter of the elements may be of circular, rectangular, hexagonal or other known geometrical shape or be irregular in perimeter shape. The elements may be discrete, with no contact between neighbouring elements, or they may be touching or definitely connected to neighbouring elements such that one element merges into others. Where complete merging of the elements has occurred, the thin film of the invention is continuous. In any one catalytic material produced by the process of the invention, different arrangements of the elements may be combined such that there are areas on the support material that are covered with a thin continuous film, areas with discrete elements and areas with merged or partially merged elements. In some cases the thickness of each element is uniform across its extent, but the thickness may vary, for example the thickness at the perimeter of the element may be less than in the middle such that the element appears domed. Merging of such domed elements may lead to coverage of the support material with an undulating thin film, which may be continuous, covering all of the support material, or discontinuous, or vary across the surface of the support material.

The thin film catalyst coating suitably has a mean thickness of ≤8 nm, and suitably has a mean thickness of ≤6 nm, preferably ≤5 nm. The thin film catalyst coating suitably has a mean thickness ≥0.6 nm, preferably ≥1 nm and most preferably ≥2 nm. The mean thickness of the coating is determined by techniques known to those in the art, for example by taking a number of measurements across the thin film catalyst coating and calculating the mean.

The support material may be any material that is suitable for use in the present invention. Suitably, the support material is resistant to corrosion when the catalytic material is used under fuel cell operating conditions.

In one embodiment, the support material is a fibre. The fibre is suitably carbon (e.g. made from a carbonisable polymer, such as polyacrylonitrile, polyimide, cellulose), a polymer (e.g. polybenzimidazole, polyimide, polytetrafluoroethylene (PTFE)), a metal oxide (e.g. a conductive metal oxide, such as doped titanium oxide or doped tin oxide), a conductive mixed metal oxide (e.g. as disclosed in PCT patent application no. PCT/GB2011/052472), a metal nitride (e.g. a conductive nitride, such as titanium nitride), a metal carbide (e.g. a conductive metal carbide, such as tungsten carbide, titanium carbide) or a metal. These fibres may be produced by electrospinning, force spinning, rotary jet spinning, melt spinning and other conventional techniques known to those skilled in the art for making fibres. Suitably, the fibre support material has a length greater than 0.5 µm, more suitably 1 µm, preferably 3 µm and a high aspect ratio. The maximum length of the fibres will be dependent on the nature of the fibre and the process by which they are produced. By 'high aspect ratio' is meant the length is considerably greater (for example at least 6 times, suitably at least 15 times and preferably at least 30 times) than the cross-sectional dimensions. Suitably, the greatest cross-sectional dimension of the fibre support material is in the range of 30 to 500 nm, suitably 30 to 200 nm and preferably 30 to 100 nm.

In a second embodiment, the support material is a particulate. The particulate may be a carbon particle, for example a commercially available high surface area carbon black (such as available from Cabot Corp (Vulcan XC72R) and Akzo Nobel (Ketjen black series)) or a graphitised version of these carbon blacks or other commercially available carbon blacks such as acetylene blacks (e.g. those available from Denka). The carbon may also be one specifically designed for use in a fuel cell such as those described in International patent application No. PCT/GB2012/052306. Alternatively, the particulate may be a metal oxide (e.g. titania, zirconia, silica or a mixed oxide, in particular a conductive mixed oxide such as niobia-doped titania, phosphorous-doped tin oxide and mixed platinum group metal oxides or mixed metal oxides as disclosed in International patent application no. PCT/GB2011/052472), a carbide (e.g. tungsten carbide or titanium carbide), a nitride, in particular a conductive nitride, (e.g. titanium nitride or titanium aluminium nitride).

In some embodiments, the support material and/or adhesion layer (if present) may have catalytic activity for a different catalytic reaction to the thin film catalyst coating and in this case, it is preferred that the thin film catalyst coating does not completely cover the support material and/or adhesion layer, but is absent in some places such that the support material and/or adhesion layer is visible. For example, the support material and/or adhesion layer may be a conductive mixed metal oxide (as hereinbefore described) which acts as a catalyst for an oxygen evolution reaction. Where the support material and/or adhesion layer has catalytic activity suitably 20-80%, preferably 40-60%, of the support material and/or adhesion layer is not covered by the thin film catalyst coating.

The catalytic material prepared according to the process of the present invention has use in a catalyst layer, for example for use in an electrode of an electrochemical cell, such as a fuel cell. The catalytic material is formed into a layer by a number of methods known to those skilled in the art, for example by preparation of an ink and applying the ink to a membrane or gas diffusion layer or transfer substrate by standard methods such as printing, spraying, knife over roll, powder coating, electrophoresis etc. In an embodiment where the support material is an electrospun fibre, a pre-formed layer of the support material may be created, the thin film catalyst coating then being applied to the pre-formed layer of support material to provide a free-standing catalyst layer. The free-standing catalyst layer is then applied to a substrate (e.g. a membrane or gas diffusion layer) by a simple lamination process.

The catalyst layer may comprise more than one different type of catalytic material of the invention, the different types of catalytic material having the same catalytic function or having different catalytic functions. For example, the catalyst layer may comprise catalytic materials of the invention having different support materials and/or different thin film catalyst coatings. Some of the catalytic materials may comprise an interlayer and some may not. If more than one different type of catalytic material is used in the catalyst layer, the different catalytic materials may be mixed or may be in separate layers or a combination of the two.

The catalyst layer may comprise one or more catalytic materials of the invention and one or more conventional nanoparticulate catalysts having the same or different catalytic functions. For example, when the catalytic material of the invention is used for the oxygen reduction reaction or the hydrogen oxidation reaction, the conventional catalyst component is active for the oxygen evolution reaction or vice versa.

If the form of the support material is fibrous or of high aspect ratio, then the catalytic material may be arranged isotropically (i.e. all the fibres aligned in the same direction) within the planar dimensions of a catalyst layer to increase the packing density of the material and reduce the porosity of the layer. It will be apparent that the isotropy can be varied from highly aligned to randomly aligned (anisotropic) according to the desired structure of the catalyst layer.

The thickness of the catalyst layer is suitably ≤100 µm, more suitably ≤20 µm, preferably ≤10 µm and most preferably ≤5 µm. Suitably, the thickness of the catalyst layer is ≥0.3 microns, preferably ≥0.5 microns.

The porosity of the catalyst layer is suitably ≥20%, preferably ≥40% and most preferably between 50 and 70%.

The catalyst layer may also comprise additional components. Such components include, but are not limited to: a proton conductor (e.g. a polymeric or aqueous electrolyte, such as a perfluorosulphonic acid (PFSA) polymer (e.g. Nafion®), a hydrocarbon proton conducting polymer (e.g. sulphonated polyarylene), or phosphoric acid); a hydrophobic additive (a polymer such as PTFE or an inorganic solid with or without surface treatment) or a hydrophilic (a polymer or an inorganic solid, such as an oxide) additive to control water transport; an additional catalytic material for example having activity for the decomposition of hydrogen peroxide (e.g. ceria or manganese dioxide).

If the catalytic material of the catalyst layer has not previously undergone heat treatment or electrochemical cycling before being formed into the catalyst layer, it may be beneficial to perform this treatment on the catalyst layer to reduce the number of low coordination metal atoms, or to otherwise change the morphology of the thin film catalyst coating.

The catalytic material prepared by the process of the invention can also be used in an electrode comprising a gas diffusion layer (GDL) and a catalyst layer comprising the catalytic material. Typical gas diffusion layers are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the NOS series available from CeTech Co., Ltd. Taiwan), or on woven carbon fibre cloth substrates (e.g. the SCCG series of carbon cloths available from the SAATI Group, S.p.A., Italy; or the WOS series available from CeTech Co., Ltd, Taiwan). For many PEMFC and direct methanol fuel cell (DMFC) applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the gas diffusion layers are between 100 and 400 µm thick. Preferably there is a layer of particulate material such as carbon black and PTFE on the face of the gas diffusion layer that contacts the catalyst layer.

In PEM fuel cells, the electrolyte is a proton conducting membrane. The catalyst layer containing the catalytic material prepared by the process of the invention may be deposited onto one or both faces of the proton conducting membrane to form a catalysed membrane.

The membrane may be any membrane suitable for use in a PEMFC, for example the membrane may be based on a perfluorinated sulphonic acid material such as Nafion® (DuPont), Aquivion® (Solvay-Plastics), Flemion® (Asahi Glass) and Aciplex® (Asahi Kasei). Alternatively, the membrane may be based on a sulphonated hydrocarbon membrane such as those available from FuMA-Tech GmbH as the Fumapem® P, E or K series of products, JSR Corporation, Toyobo Corporation, and others. The membrane may be a composite membrane, containing the proton-conducting material and other materials that confer properties such as mechanical strength. For example, the membrane may comprise an expanded PTFE substrate. Alternatively, the membrane may be based on polybenzimidazole doped with phosphoric acid and include membranes from developers such as BASF Fuel Cell GmbH, for example the Celtec®-P membrane which will operate in the range 120° C. to 180° C. Other components may be added to the membrane, for example to improve the durability, as will be known to those in the art.

The substrate onto which the catalyst layer is applied may be a transfer substrate. The transfer substrate may be any suitable transfer substrate known to those skilled in the art but is preferably a polymeric material such as polytetrafluoroethylene (PTFE), polyimide, polyvinylidene difluoride (PVDF), or polypropylene (especially biaxially-oriented polypropylene, BOPP) or a polymer-coated paper such as polyurethane coated paper. The transfer substrate could also be a silicone release paper or a metal foil such as aluminium foil. The catalyst layer of the invention may then be transferred to a GDL or membrane by techniques known to those skilled in the art.

The catalytic material prepared by the process of the invention may be present in a membrane electrode assembly comprising a catalyst layer, electrode or catalysed membrane as hereinbefore described. The MEA may be made up in a number of ways including, but not limited to:
  (i) a proton conducting membrane may be sandwiched between two electrodes (one anode and one cathode), at least one of which is an electrode according to the present invention;
  (ii) a catalysed membrane coated on one side only by a catalyst layer may be sandwiched between (a) a gas diffusion layer and an electrode, the gas diffusion layer contacting the side of the membrane coated with the catalyst layer, or (b) two electrodes, and wherein at least one of the catalyst layer and the electrode(s) comprises a catalyst layer according to the present invention;
  (iii) a catalysed membrane coated on both sides with a catalyst layer may be sandwiched between (a) two gas diffusion layers, (b) a gas diffusion layer and an electrode or (c) two electrodes, and wherein at least one of the catalyst layer and the electrode(s) comprises a catalyst layer according to the present invention.

The MEA may further comprise components that seal and/or reinforce the edge regions of the MEA for example as described in WO2005/020356. The MEA is assembled by conventional methods known to those skilled in the art.

The catalytic material prepared by the process of the invention may be used in a number of applications, for example in a PEMFC or in fuel cell utilising liquid acid electrolytes, such as the phosphoric acid electrolyte fuel cell (PAFC) and in particular at the cathode (preferably when the first metal is platinum) for the oxygen reduction reaction. The PEMFC or PAFC operates on hydrogen or a hydrogen-rich fuel at the anode or could be fuelled with a hydrocarbon fuel such as methanol. The catalytic material prepared by the process of the invention may also be used at the anode of the PEMFC or PAFC operating on these fuels.

The catalytic material prepared by the process of the invention may also be used at the cathode or anode of fuel cells in which the solid polymeric membranes use charge carriers other than protons, for example $OH^-$ conducting membranes such as those available from Tokuyama Soda Ltd., FuMA-Tech GmbH.

The catalytic material prepared by the process of the invention may also be used in other low temperature fuel cells that employ liquid ion conducting electrolytes, such as aqueous acids and alkaline solutions or concentrated phosphoric acid.

Furthermore, the catalytic material prepared by the process of the invention may also be used as the hydrogen evolution or the oxygen evolution electrode in a PEM electrolyser or electrolyser based on alkaline electrolyte.

The invention claimed is:

1. A process for preparing a catalytic material comprising (i) a support material and (ii) a thin film catalyst coating comprising one or more first metals, wherein said process comprises the steps of:
  (i) providing a multilayer thin film coating of a second metal onto the support material, wherein the multilayer thin film coating of the second metal onto the support material consists of a one-step process; and
  (ii) spontaneous galvanic displacement of at least some of the second metal with the one or more first metals, wherein the second metal is less noble than the one or more first metals.

2. The process according to claim 1, wherein the one or more first metals are suitably selected from the group consisting of platinum group metals (platinum, palladium, rhodium, ruthenium, iridium and osmium), gold, silver, and a base metal.

3. The process according to claim 1, wherein the second metal is a base metal.

4. The process according to claim 1, wherein the entire multilayer thin film coating of second metal is displaced with the one or more first metals.

5. The process according to claim 1, wherein the multilayer thin film coating of second metal is not completely displaced with the one or more first metals.

6. The process according to claim 5, wherein the one or more first metals and the second metal remain in separate layers.

7. The process according to claim 5, wherein at least some of the one or more first metals and at least some of the second metal form an alloy.

8. The process according to claim 1, wherein at least one of steps (i) and (ii) are repeated one or more times.

9. The process according to claim 1, wherein an adhesion layer is applied to the support material prior to providing the multilayer coating of the second metal.

10. The process according to claim 2, wherein the second metal is a base metal.

11. The process according to claim 1, wherein the one-step process is selected from the group consisting of atomic layer deposition, chemical vapor deposition, and plating.

12. The process according to claim 9, wherein the adhesion layer comprises an electrically conductive material selected from the group consisting of titanium nitride, titanium aluminum nitride, niobium-doped titanium, mixed platinum group metal oxides, and carbon- or boron-doped diamond.

13. A process for preparing a catalytic material comprising (i) a support material and (ii) a thin film catalyst coating, the process comprising:
   (i) providing a thin film coating of a second metal on the support material, wherein the thin film coating of the second metal onto the support material is carried out by a one-step process; and
   (ii) spontaneous galvanic displacement of at least some of the second metal with one or more first metals to form the thin film catalyst coating,
   wherein the second metal is a base metal and the one or more first metals are selected from the group consisting of platinum group metals, gold, and silver.

* * * * *